United States Patent
Mensah

(10) Patent No.: US 6,991,414 B1
(45) Date of Patent: Jan. 31, 2006

(54) FASTENER ASSEMBLY

(76) Inventor: James S. Mensah, P.O. Box 1605, Skokie, IL (US) 60076

( * ) Notice: Subject to any disclaimer, the term of this patent is extended or adjusted under 35 U.S.C. 154(b) by 123 days.

(21) Appl. No.: 10/436,492

(22) Filed: May 12, 2003

(51) Int. Cl.
*F16B 37/00* (2006.01)

(52) U.S. Cl. .................. 411/231; 74/89.42; 411/338; 411/427; 411/432

(58) Field of Classification Search ............ 411/338, 411/432, 427, 231; 74/89.42, 409, 440
See application file for complete search history.

(56) References Cited

U.S. PATENT DOCUMENTS

| | | | | |
|---|---|---|---|---|
| 467,130 | A | * | 1/1892 | Finnigan ............... 30/268 |
| 953,298 | A | * | 3/1910 | Schmidt ............... 411/338 |
| 1,508,822 | A | * | 9/1924 | Schade ............... 411/338 |
| 1,967,039 | A | * | 7/1934 | Mohr ............... 248/479 |
| 2,386,729 | A | * | 10/1945 | Watter ............... 411/338 |
| 3,785,670 | A | * | 1/1974 | Smith ............... 280/79.11 |
| 4,131,031 | A | | 12/1978 | Erikson et al. ............... 74/441 |
| 4,353,264 | A | | 10/1982 | Erikson et al. ............... 74/441 |
| 4,433,590 | A | | 2/1984 | Benoit et al. ............... 74/409 |
| 4,954,032 | A | | 9/1990 | Morales ............... 411/289 |
| 5,205,667 | A | * | 4/1993 | Montgomery, Sr. ......... 403/151 |
| 5,237,902 | A | * | 8/1993 | Hamanaga ............... 84/386 |
| 5,294,226 | A | * | 3/1994 | Chow ............... 411/338 |
| D368,020 | S | | 3/1996 | Shirai ............... D8/397 |
| 5,653,481 | A | * | 8/1997 | Alderman ............... 285/363 |
| 5,839,321 | A | | 11/1998 | Siemons ............... 74/441 |
| 6,119,541 | A | * | 9/2000 | Robinson ............... 74/441 |
| 6,131,478 | A | * | 10/2000 | Erikson et al. ............... 74/441 |
| 6,250,608 | B1 | * | 6/2001 | Ridley ............... 254/415 |
| 6,488,459 | B2 | * | 12/2002 | Carpenter ............... 411/325 |

* cited by examiner

*Primary Examiner*—Lloyd A. Gall

(57) ABSTRACT

A fastener assembly for making it easier to tighten and loosen the fastener in confined work spaces. The fastener assembly includes a first end-cap member having a head member, a first boss-like member being attached to a side of the head member, a male extended portion being securely attached to and extending outwardly from the first boss-like member, and a threaded bore extending through the head member, the first boss-like member and the male extended portion; and also includes a second end-cap member having a base portion, a second boss-like portion being securely attached to a side of the base portion, a female extended portion being securely attached to and extending outwardly from the second boss-like portion, and a bore extending through the base portion, the second boss-like portion and the female extended portion; and further includes an elongate threaded fastening member being adapted to fasten the first and second end-cap members together and being adapted to be removably received in the bores of the first and second end-cap members; and also includes a spring member being removably mounted about the elongate threaded fastening member.

8 Claims, 3 Drawing Sheets

FASTENER ASSEMBLY

BACKGROUND OF THE INVENTION

1. Field of the Invention

The present invention relates to an easily accessible, quick-locking fastener and more particularly pertains to a new fastener assembly for making it easier to tighten and loosen the fastener in confined work spaces.

2. Description of the Prior Art

The use of an easily accessible, quick-locking fastener is known in the prior art. More specifically, an easily accessible, quick-locking fastener heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,954,032; U.S. Pat. No. 5,839,321; U.S. Pat. No. 4,131,031; U.S. Pat. No. 4,433,590; U.S. Pat. No. 4,353,264; and U.S. Patent No. Des. 368,020.

While these devices fulfill their respective, particular objectives and requirements, the aforementioned patents do not disclose a new fastener assembly. The inventive device includes a first end-cap member having a head member, a first boss-like member being attached to a side of the head member, a male extended portion being securely attached to and extending outwardly from the first boss-like member, and a threaded bore extending through the head member, the first boss-like member and the male extended portion; and also includes a second end-cap member having a base portion, a second boss-like portion being securely attached to a side of the base portion, a female extended portion being securely attached to and extending outwardly from the second boss-like portion, and a bore extending through the base portion, the second boss-like portion and the female extended portion; and further includes an elongate threaded fastening member being adapted to fasten the first and second end-cap members together and being adapted to be removably received in the bores of the first and second end-cap members; and also includes a spring member being removably mounted about the elongate threaded fastening member.

In these respects, the fastener assembly according to the present invention substantially departs from the conventional concepts and designs of the prior art, and in so doing provides an apparatus primarily developed for the purpose of making it easier to tighten and loosen the fastener in confined work spaces.

SUMMARY OF THE INVENTION

In view of the foregoing disadvantages inherent in the known types of easily accessible, quick-locking fastener now present in the prior art, the present invention provides a new fastener assembly construction wherein the same can be utilized for making it easier to tighten and loosen the fastener in confined work spaces.

The general purpose of the present invention, which will be described subsequently in greater detail, is to provide a new fastener assembly which has many of the advantages of the easily accessible, quick-locking fastener mentioned heretofore and many novel features that result in a new fastener assembly which is not anticipated, rendered obvious, suggested, or even implied by any of the prior art easily accessible, quick-locking fastener, either alone or in any combination thereof.

To attain this, the present invention generally comprises a first end-cap member having a head member, a first boss-like member being attached to a side of the head member, a male extended portion being securely attached to and extending outwardly from the first boss-like member, and a threaded bore extending through the head member, the first boss-like member and the male extended portion; and also includes a second end-cap member having a base portion, a second boss-like portion being securely attached to a side of the base portion, a female extended portion being securely attached to and extending outwardly from the second boss-like portion, and a bore extending through the base portion, the second boss-like portion and the female extended portion; and further includes an elongate threaded fastening member being adapted to fasten the first and second end-cap members together and being adapted to be removably received in the bores of the first and second end-cap members; and also includes a spring member being removably mounted about the elongate threaded fastening member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fastener assembly which has many of the advantages of the easily accessible, quick-locking fastener mentioned heretofore and many novel features that result in a new fastener assembly which is not anticipated, rendered obvious, suggested, or even implied by any of the prior art easily accessible, quick-locking fastener, either alone or in any combination thereof.

It is another object of the present invention to provide a new fastener assembly which may be easily and efficiently manufactured and marketed.

It is a further object of the present invention to provide a new fastener assembly which is of a durable and reliable construction.

An even further object of the present invention is to provide a new fastener assembly which is susceptible of a low cost of manufacture with regard to both materials and labor, and which accordingly is then susceptible of low prices of sale to the consuming public, thereby making such fastener assembly economically available to the buying public.

Still yet another object of the present invention is to provide a new fastener assembly which provides in the apparatuses and methods of the prior art some of the advantages thereof, while simultaneously overcoming some of the disadvantages normally associated therewith.

Still another object of the present invention is to provide a new fastener assembly for making it easier to tighten and loosen the fastener in confined work spaces.

Yet another object of the present invention is to provide a new fastener assembly which includes a first end-cap member having a head member, a first boss-like member being attached to a side of the head member, a male extended portion being securely attached to and extending outwardly from the first boss-like member, and a threaded bore extending through the head member, the first boss-like member and the male extended portion; and also includes a second end-cap member having a base portion, a second boss-like portion being securely attached to a side of the base portion, a female extended portion being securely attached to and extending outwardly from the second boss-like portion, and a bore extending through the base portion, the second boss-like portion and the female extended portion; and further includes an elongate threaded fastening member being adapted to fasten the first and second end-cap members together and being adapted to be removably received in the bores of the first and second end-cap members; and also includes a spring member being removably mounted about the elongate threaded fastening member.

Still yet another object of the present invention is to provide a new fastener assembly that can be tightened and loosened without having to hold both end-cap members.

Even still another object of the present invention is to provide a new fastener assembly that would save the user substantial time and energy in tightening and loosening fasteners in hard-to-reach places.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
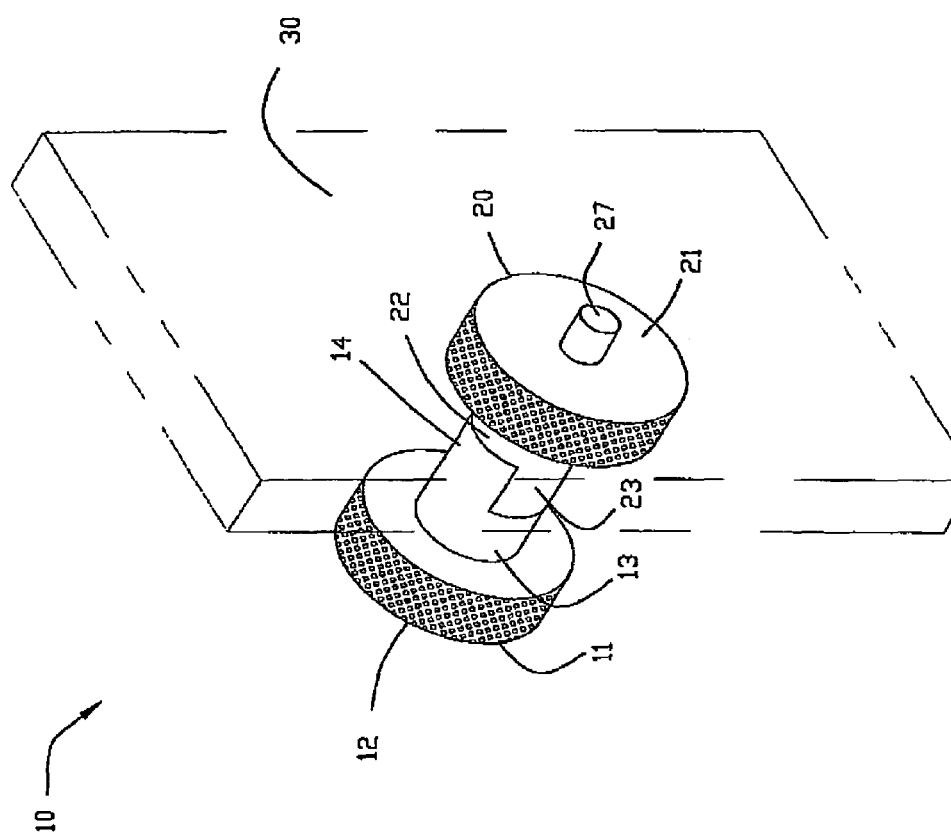
FIG. 1 is a perspective view of a new fastener assembly according to the present invention and shown in use.
Figure 2:
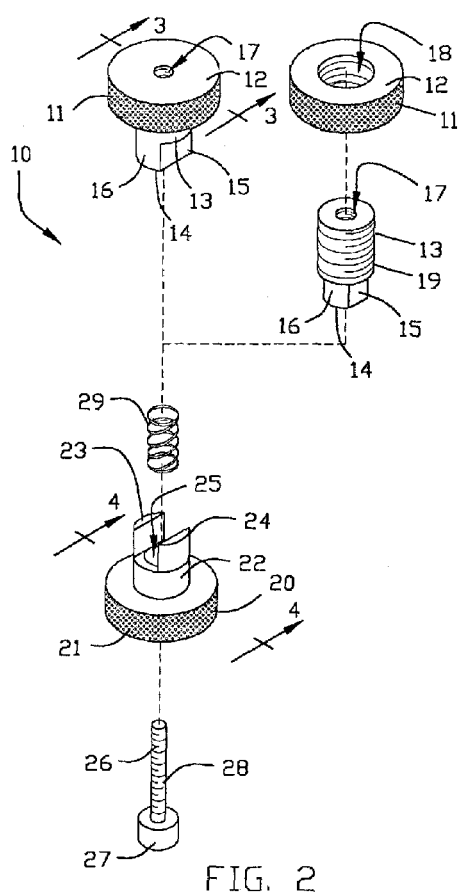
FIG. 2 is an exploded perspective view of the present invention.
Figure 3:
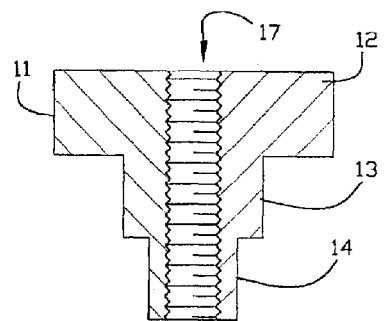
FIG. 3 is a cross-sectional view of the first end-cap member of the present invention.
Figure 4:
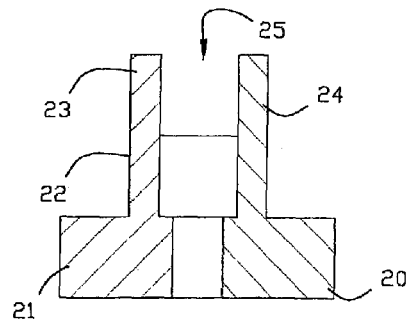
FIG. 4 is a cross-sectional view of the second end-cap member of the present invention.
Figure 5:
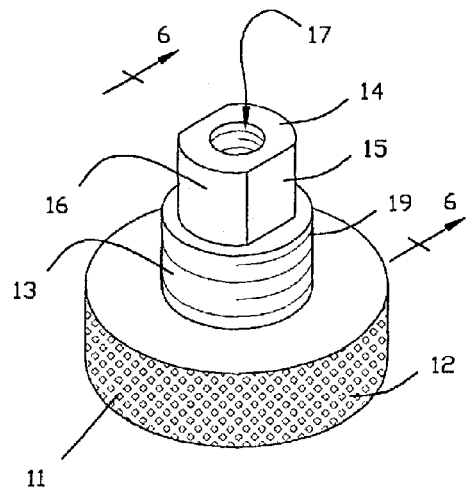
FIG. 5 is a bottom perspective view of the second embodiment of the first end-cap member of the present invention.
Figure 6:
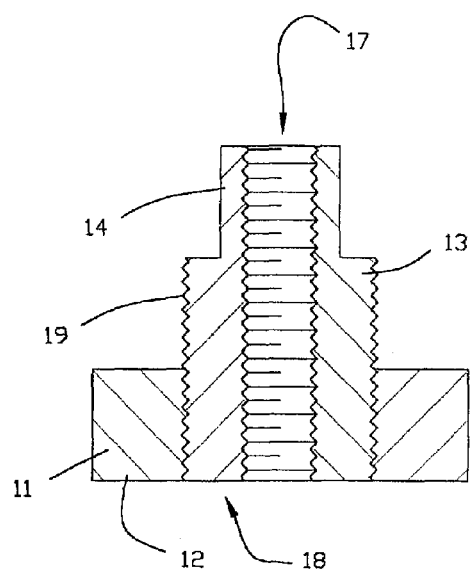
FIG. 6 is a cross-sectional view of the second embodiment of the first end-cap of the present invention.

With reference now to the drawings, and in particular to FIGS. 1 through 6 thereof, a new fastener assembly embodying the principles and concepts of the present invention and generally designated by the reference numeral 10 will be described.

As best illustrated in FIGS. 1 through 6, the fastener assembly 10 generally comprises a first end-cap member 11 having a head member 12, a first boss-like member 13 being conventionally attached to a side of the head member 12, a male extended portion 14 being securely and conventionally attached to and extending outwardly from the first boss-like member 13, and a threaded bore 17 extending through the head member 12, the first boss-like member 13 and the male extended portion 14. The male extended portion 14 has planar sides 15 which are recessed relative to the first-boss like member 13, and also has curved ends 16 which are flush with a side of the first boss-like member 13.

The fastener assembly 10 also comprises a second end-cap member 20 having a base portion 21, a second boss-like portion 22 being securely and conventionally attached to a side of the base portion 21, a female extended portion 23,24 being securely and conventionally attached to and extending outwardly from the second boss-like portion 22, and a bore 25 extending through the base portion 21 and the second boss-like portion 22. The female extended portion 23,24 includes a pair of diametrically-opposed projecting members 23,24 being spaced apart and having outer sides which are curved and also having inner sides which are generally planar. The male extended portion 14 is removably and lockingly received in the space between the diametrically-opposed projecting members 23,24 with the outer sides being generally flush with a side of the second boss-like portion 22.

An elongate threaded fastening member 26 is adapted to fasten the first and second end-cap members 11,20 together and is adapted to be removably received in the bores 17,25 of the first and second end-cap members 11,20 with the elongate threaded fastening member 26 including a head portion 27 and a threaded shaft portion 28 which is removably received in the bores 17,25 of the first and second end-cap members 11,20.

A spring member 29 is removably mounted about the elongate threaded fastening member 26.

As a second embodiment, the bore 17 of the first end-cap member 11 includes an enlarged portion 18 extending through the head member 12 with the first boss-like member 13 having a threaded exterior wall 19. The first boss-like member 13 is threaded into the enlarged portion 18 of the bore 17 of the first end-cap member 11.

In use, the user extends the male extended portion 14 through the objects 30 which are intended to be fastened together and then secures the female extended portion 23,24 about the male extended portion 14 and inserts the elongate threaded fastening member 26 through the bores 17,25 of the first and second end-cap members 11,20 to securely fasten the objects 30 together. To loosen the first end-cap member 11 from the second end-cap member 20, the user simply grasps either the head member 12 or the base portion 21 with both having a knurled exterior side and turns out the threaded elongate fastening member 26 from the bores 17,25.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fastener assembly comprising:
    a first end-cap member having a head member, a first boss-like member being attached to a side of said head member, a male extended portion being securely attached to and extending outwardly from said first boss-like member, and a threaded bore extending through said head member, said first boss-like member and said male extended portion;
    a second end-cap member having a base portion, a second boss-like portion being securely attached to a side of said base portion, a female extended portion being securely attached to and extending outwardly from said second boss-like portion, and a bore extending through said base portion and said second boss-like portion;
    an elongate threaded fastening member being adapted to fasten said first and second end-cap members together and being adapted to be removably received in said bores of said first and second end-cap members;
    a spring member being removably mounted about said elongate threaded fastening member for facilitating separation of said first end-cap member from said second end-cap member; and
    said second boss-like portion of said second end-cap member substantially housing said spring member therein to maintain positioning of said spring member with respect to said elongate threaded fastening member when said elongate threaded fastening member disengages said first end-cap member from said second end-cap member.

2. A fastener assembly as described in claim 1, wherein said male extended portion has planar sides which are recessed relative to said first boss-like member, and has curved ends which are flush with a side of said first boss-like member.

3. A fastener assembly as described in claim 2, wherein said female extended portion includes a pair of diametrically-opposed projecting members being spaced apart and having outer sides which are curved and also having inner sides which are generally planar, said male extended portion being removably and lockingly received in said space between said diametrically-opposed projecting members, said outer sides being generally flush with a side of said second boss-like portion.

4. A fastener assembly as described in claim 3, wherein said elongate threaded fastening member includes a head portion and a threaded shaft portion which is removably received in said bores of said first and second end-cap members.

5. A fastener assembly as described in claim 4, wherein said bore of said first end-cap member has an enlarged portion extending through said head member.

6. A fastener assembly as described in claim 5, wherein said first boss-like member has an exterior wall which is threaded, said first boss-like member being threaded into a threaded portion of said bore of said first end-cap member.

7. A fastener assembly comprising:
    a first end-cap member having a head member, a first boss-like member being attached to a side of said head member, a male extended portion being securely attached to and extending outwardly from said first boss-like member, and a threaded bore extending through said head member, said first boss-like member and said male extended portion, said male extended portion having planar sides which are recessed relative to said first boss-like member, and also having curved ends;
    a second end-cap member having a base portion, a second boss-like portion being securely attached to a side of said base portion, a female extended portion being securely attached to and extending outwardly from said second boss-like portion, and a bore extending through said base portion and said second boss-like portion, said female extended portion including a pair of diametrically-opposed projecting members being spaced apart and having outer sides which are curved and also having inner sides which are generally planar, said male extended portion being removably and lockingly received in said space between said diametrically-opposed projecting members, said outer sides being generally flush with a side of said second boss-like portion;
    an elongate threaded fastening member being adapted to fasten said first and second end-cap members together and being adapted to be removably received in said bores of said first and second end-cap members, said elongate threaded fastening member including a head portion and a threaded shaft portion which is removably received in said bores of said first and second end-cap members;
    a spring member being removably mounted about said elongate threaded fastening member for facilitating separation of said first end-cap member from said second end-cap member; and
    said second boss-like portion of said second end-cap member substantially housing said spring member therein to maintain positioning of said spring member with respect to said elongate threaded fastening member when said elongate threaded fastening member disengages said first end-cap member a said second end-cap member.

8. A fastener assembly as described in claim 7, wherein said bore of said first end-cap member includes an enlarged portion extending through said head member, said first boss-like member having a threaded exterior wall, said first boss-like member being threaded into said threaded portion of said bore of said first end-cap member.

* * * * *